(12) United States Patent
Liu et al.

(10) Patent No.: US 7,343,175 B2
(45) Date of Patent: Mar. 11, 2008

(54) PEAK CURRENT CONTROL IN WIRELESS NETWORK INTERFACE DEVICES

(75) Inventors: Ping Liu, Surrey (CA); Bruce Miller, Coquitlam (CA); Rachel Wong, Burnaby (CA)

(73) Assignee: Sierra Wireless, Inc., Richmond (CA)

( * ) Notice: Subject to any disclaimer, the term of this patent is extended or adjusted under 35 U.S.C. 154(b) by 236 days.

(21) Appl. No.: 10/439,990

(22) Filed: May 16, 2003

(65) Prior Publication Data

US 2004/0229660 A1 Nov. 18, 2004

(51) Int. Cl.
*H04Q 7/20* (2006.01)
(52) U.S. Cl. .................. 455/557; 455/574; 455/572; 455/127.1; 455/127.5
(58) Field of Classification Search .. 455/127.1–127.5, 455/522, 572–594, 557–559, 343.1, 550.1, 455/95, 73, 574; 235/492
See application file for complete search history.

(56) References Cited

U.S. PATENT DOCUMENTS

| 5,999,832 | A * | 12/1999 | Vannatta et al. ......... 455/575.1 |
| 2003/0101303 | A1* | 5/2003 | Kung ........................ 710/301 |

FOREIGN PATENT DOCUMENTS

| EP | 0561 257 A1 | 9/1993 |
| EP | 0 735 642 A1 | 10/1996 |
| EP | 1 024 612 A1 | 8/2000 |

OTHER PUBLICATIONS

CompactFlash Association, "CF+ and CompactFlash Specification Revision 1.4", 1998-99, 7 pp., no month.

* cited by examiner

*Primary Examiner*—Joseph Feild
*Assistant Examiner*—Pierre-Louis Desir
(74) *Attorney, Agent, or Firm*—Thelen Reid Brown Raysman & Steiner LLP (57) ABSTRACT

Methods of and apparatuses for varying and controlling the effective series resistance (ESR) of a power supply rail configured to transmit power from a power supply of a host device to a wireless network interface device (e.g. a wireless modem). Varying and controlling the ESR of the power supply rail, relative to an ESR of a super capacitor coupled to the power supply rail, allows control of the currents drawn from the host power supply and a super capacitor. During a time when the wireless network interface device is transmitting or is about to transmit, the ESR of the power supply rail is increased so that it exceeds the ESR of the super capacitor, thereby causing current for the power amplifier (PA) of the wireless network interface device to be drawn primarily from the super capacitor, rather than from the host power supply. During a time when the wireless network interface device has completed transmitting or is about to complete transmitting, the ESR of the host power supply is lowered so that it is less than the ESR of the super capacitor, thereby causing the super capacitor to enter a charging state.

28 Claims, 5 Drawing Sheets

PEAK CURRENT CONTROL IN WIRELESS NETWORK INTERFACE DEVICES

FIELD OF THE INVENTION

The present invention relates generally to current control in electrical devices. More particularly, the present invention relates to peak current control in wireless network interface devices such as, for example, wireless modems.

BACKGROUND OF THE INVENTION

Communication devices, such as cellular telephones, allow voice communications over wireless communications networks. Such devices have become commonplace in today's world. In recent years, efforts have been made to leverage existing wireless communication systems, so that not just voice information may be communicated, but so that data from, for example, a portable (i.e. laptop) computer or personal digital assistant (PDA) may also be transmitted over the wireless networks. One result of such efforts is the General Packet Radio Service (GPRS) standard, which provides a packet switched data overlay of the Global System for Mobile Communications (GSM) wireless cellular system.

GPRS utilizes a "timeslot" principle, whereby each radio frequency (RF) carrier signal is divided into eight time slots. This allows the GPRS system to provide eight communication channels per carrier signal. By using several timeslots in parallel, data may be transmitted faster. In theory, when all eight timeslots are used, GPRS allows a maximum transmit speed of 171.2 kilobits per second (kbps). In practice, however, this data rate is not possible, and devices are categorized by the number of timeslots the devices are able to use to transmit (TX) and receive (RX) data. For example, a Class 8 device uses one TX slot and four RX slots. A Class 10 device, by comparison, uses two TX slots and four RX slots, meaning that it may transmit data bursts two times as fast a Class 8 device.

Because data from laptop computers and PDAs cannot be directly communicated over wireless networks, interface devices are necessary to gain access to the wireless network. Such interface devices include means for formatting the data in accordance with system standards (e.g. GPRS) and means for modulating a radio frequency (RF) signal by the data to be transmitted, so that the data can be transmitted wirelessly over the wireless network.

Various standards have been developed that set forth both electrical specifications and form factor requirements for interface devices of the type described above. One standard that is in common use today is the PCMCIA (Personal Computer Memory Card International Association) standard. PCMCIA is an organization, consisting of some five hundred companies, which has developed a standard for small, credit card-sized devices, called PC Cards. Although originally directed at adding memory to portable computers, the PCMCIA standard has been expanded several times and is now applicable to many types of devices other than memory. There are three types of PCMCIA PC Cards, designated as Type I, Type II and Type III. All three types have the same rectangular size (85.6 by 54 millimeters), but each differs in thickness. A Type II card can be up to 5.0 mm thick, and is the type that is used for the interface devices described above. Such interface devices, when in the form of a PC Cards, are commonly referred to as PC Card wireless modems.

Figure 1:
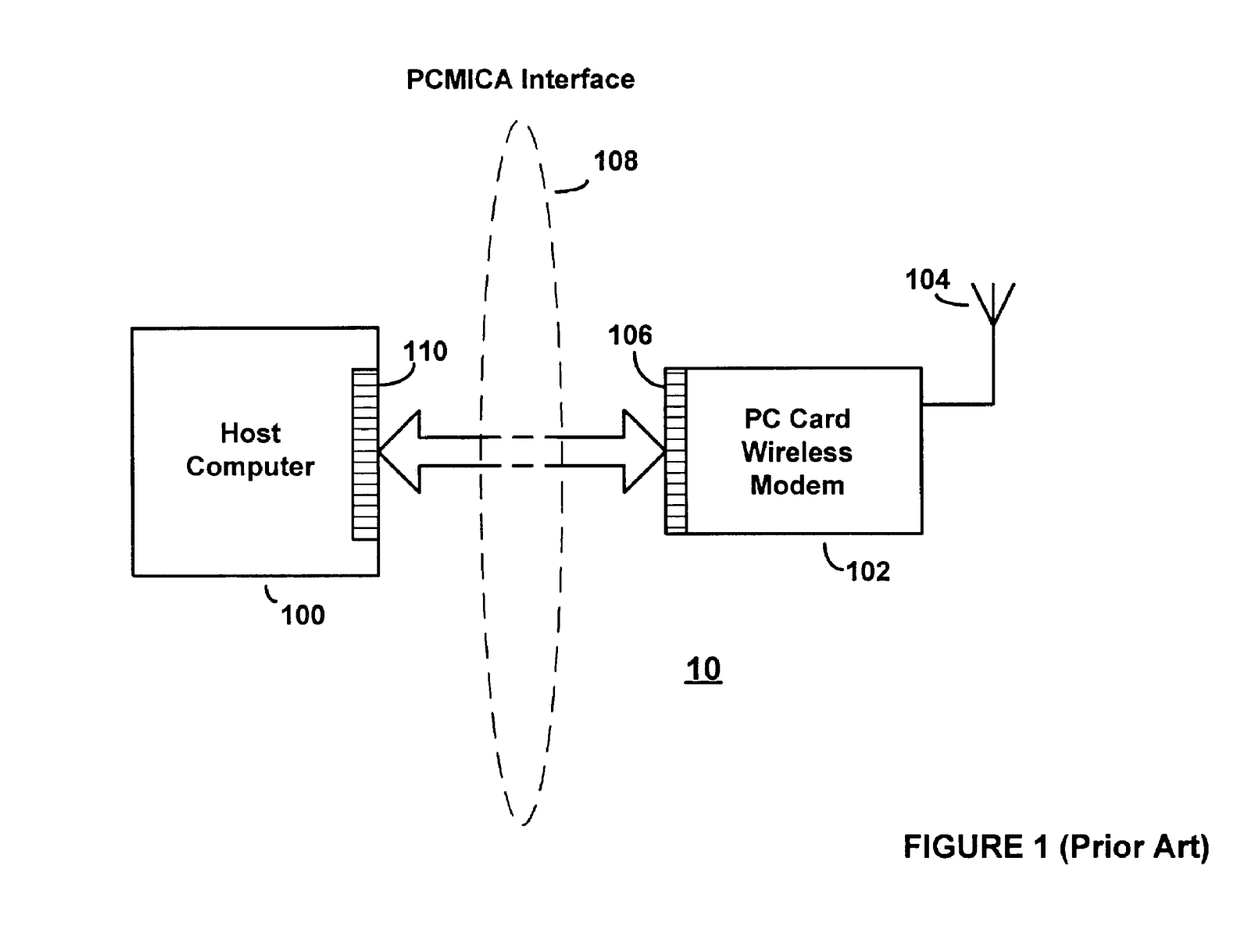
FIG. 1 shows a wireless data terminal comprising a host computer (e.g., a laptop computer or PDA) and a PC Card wireless modem.
Figure 2:
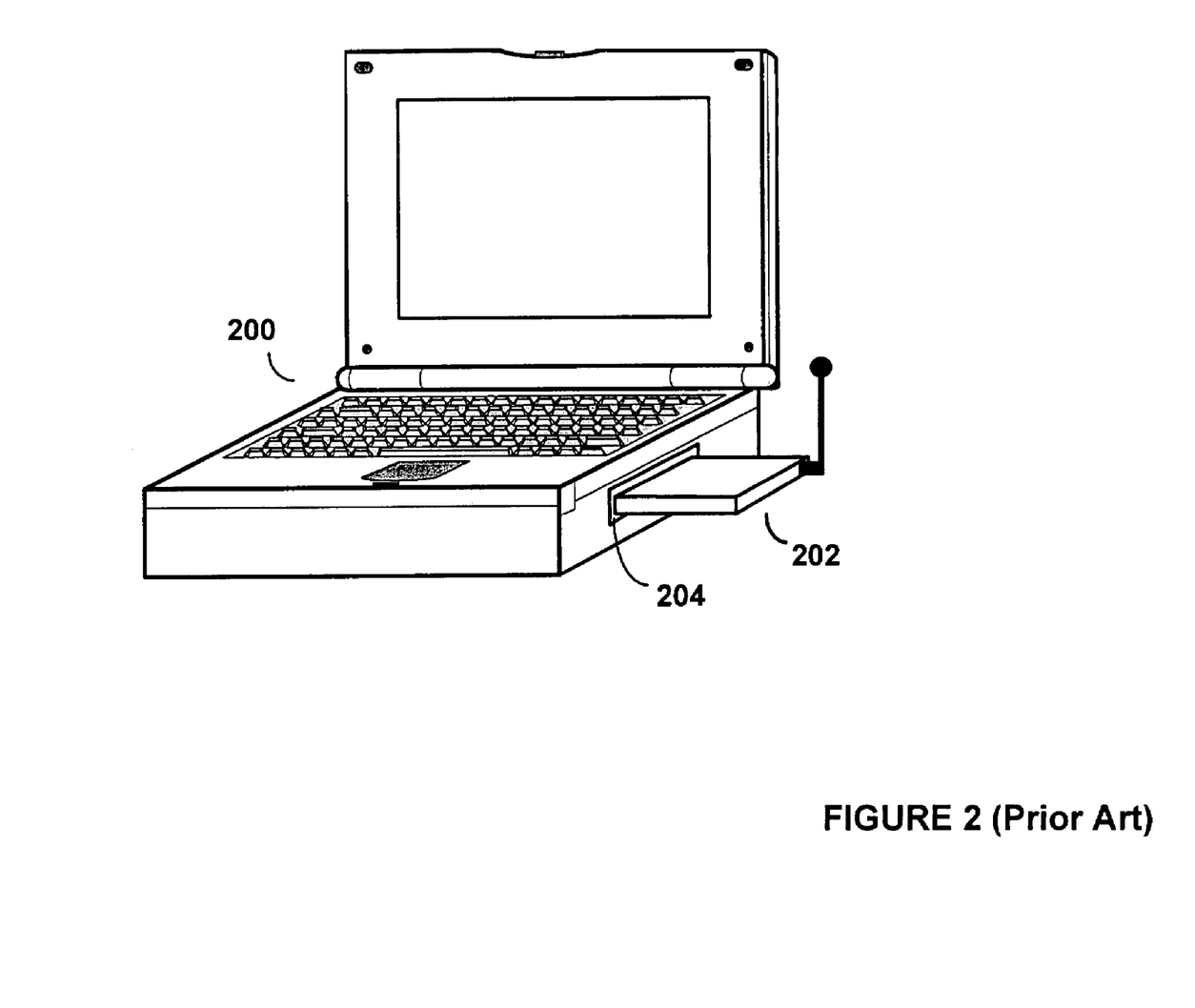
FIG. 2 shows a diagram of a laptop computer with a PC Card wireless modem plugged into the PCMCIA slot of the laptop computer.

PC Cards plug into a PCMCIA slot designed into a laptop computer or PDA. FIG. 1 shows a wireless data terminal 10 comprising a host computer 100 (e.g., a laptop computer or PDA) and a PC Card wireless modem 102. The PC Card wireless modem 102 includes an antenna 104 for transmitting/receiving radio frequency (RF) signals to/from a remote device over a wireless network. The PC Card wireless modem 102 also includes various input/output (I/O) and power and ground terminals 106, which are arranged according to the PCMCIA standard. The host computer 100 communicates with the PC Card wireless modem 102, via a PCMCIA interface 108, when terminals 106 are connected to corresponding terminals in a PCMCIA slot 110 of the host computer 100. The PCMCIA interface 108 also provides connections for supplying power from the host computer power supply (i.e. battery) to the PC card wireless modem 102, when terminals 106 are connected to corresponding terminals in the PCMCIA slot 110 of the host computer 100. This allows the PC Card wireless modem 102 to derive all of its power from the battery of the host computer 100. Hence, the PC Card wireless modem does not require its own dedicated power supply. FIG. 2 shows a conceptual diagram of a laptop computer 200 with a PC Card wireless modem 202 plugged into the PCMCIA slot 204 of the laptop computer 200.

Among other electrical specifications, the Type II PCMCIA standard specifies that the PC Card never draw more than 1 amp of current from the host power supply at any one time. Unfortunately, the power amplifier (PA) in the RF section of the PC Card wireless modem requires large currents, especially during burst transmits. This current requirement increases as the number of TX slots used by the PC Card wireless modem increases. Due to the difficulty in satisfying the PCMCIA maximum current draw standard, some PC Card wireless modem designs include an onboard "super capacitor," which is connected in parallel with the host power supply. The super capacitor lends itself as a current source during high current demand burst transmits, thereby supplementing the current provided by the host supply. In this manner the 1 amp PCMCIA maximum current draw specification can be satisfied.

Another standard of recent interest is the CompactFlash Plus (CF+) standard. The CF+ standard is an extension of the original CompactFlash (CF) standard, which was originally developed by the CompactFlash Association (CFA) for the purpose of providing small, lightweight storage devices for mobile products. The CF+ specification expands the concept beyond flash data storage to include I/O devices such as, for example, wireless modems. An attractive feature of the CF+ standard is that the form factor is smaller (about the size of a matchbook) than the form factor of a PCMCIA card, which as explained above is about the size of a credit card. A drawback from a design standpoint, however, is that the CF+ standard specifies that, at 95% of 3.3 volts, only 500 mA of peak current may be drawn from the host power supply. This is about half the allowable current draw permitted by the PCMCIA specification. Unfortunately, because many wireless modems require much more current than 500 mA, especially during burst transmits, this specification cannot be complied with. For example, a Class 10 wireless modem requires more than 1.3 amps in a two timeslot transmission configuration. Whereas attempts at achieving compliance to the CF+ standard have been made using a super capacitor, similar to that described above, these attempts have failed since even with the addition of a super capacitor the wireless modems draw currents from the host power supply that exceed the 500 mA maximum current draw limit. Accordingly, use of a super capacitor alone is not an acceptable solution to achieving specification compliance.

SUMMARY OF THE INVENTION

Methods of and apparatuses for varying and controlling the effective series resistance (ESR) of a power supply rail configured to transmit power from a power supply of a host device to a wireless network interface device. Varying and controlling the ESR of the power supply rail, relative to an ESR of a super capacitor coupled to the power supply rail, allows control of the currents drawn from the host power supply and a super capacitor. During a time when the wireless network interface device is transmitting or is about to transmit, the ESR of the power supply rail is increased so that it exceeds the ESR of the super capacitor, thereby causing current for the power amplifier (PA) of the wireless network interface device to be drawn primarily from the super capacitor, rather than from the host power supply. During a time when the wireless network interface device has completed transmitting or is about to complete transmitting, the ESR of the host power supply is lowered so that it is less than the ESR of the super capacitor, thereby causing the super capacitor to enter a charging state. According to one embodiment, the TX enable signal, found in most burst transmit wireless modem cards, is used to adaptively control the ESR of the host power supply through, for example, a field effect transistor (FET) switch.

Further aspects of the invention are described and claimed below, and a further understanding of the nature and advantages of the inventions may be realized by reference to the remaining portions of the specification and the attached drawings.

DETAILED DESCRIPTION

Figure 3:
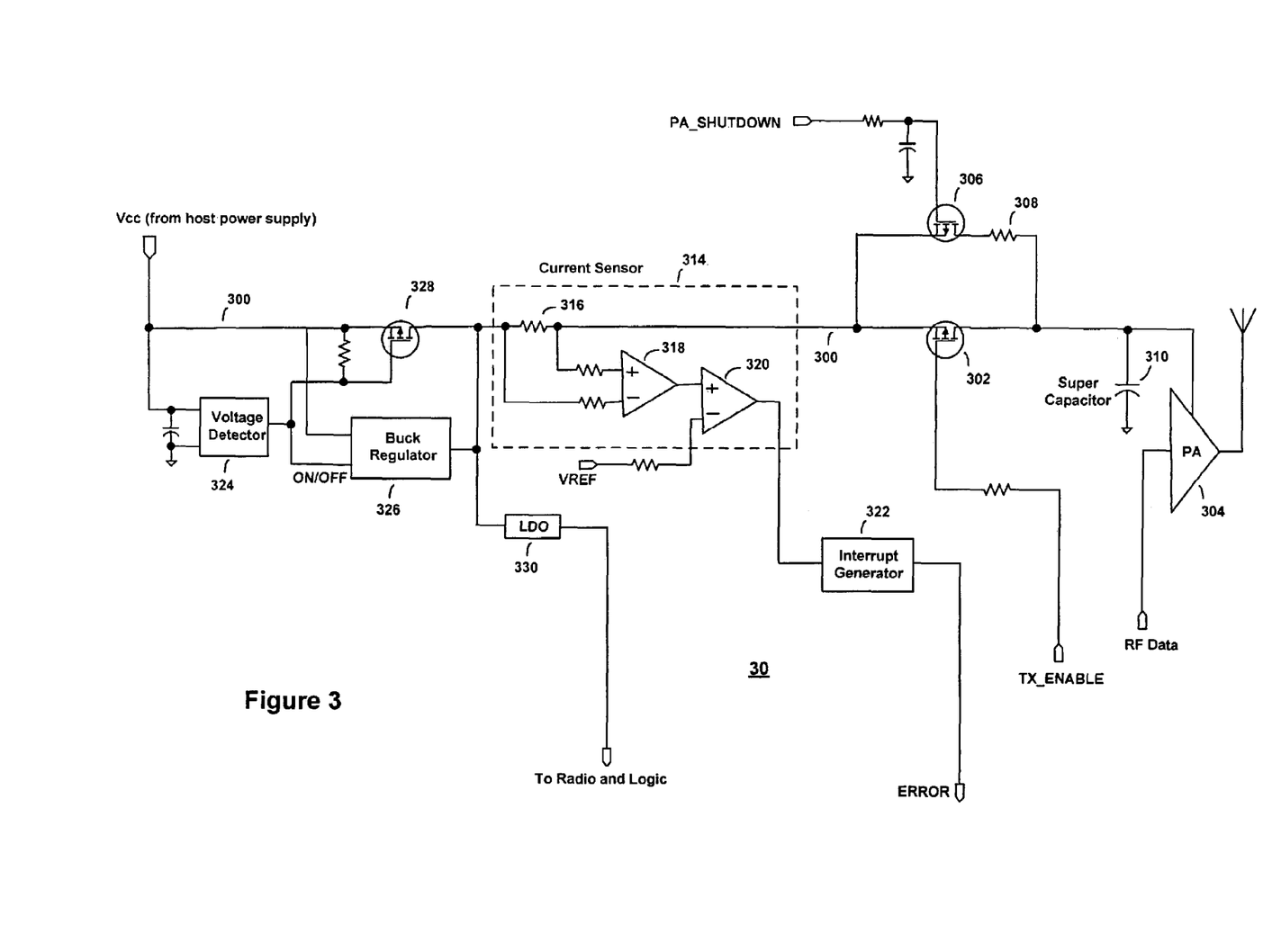
FIG. 3 shows an exemplary effective series resistance (ESR) control system, which may be used to control the ESR of a host power supply rail of a power supply of a host device, according to an embodiment of the present invention.

Referring to FIG. 3, there is shown an exemplary effective series resistance (ESR) control system 30, which may be used to control the ESR of a host power supply rail 300 of a power supply of a host device, according to an embodiment of the present invention.

According to this embodiment, when a wireless network interface device (e.g. a wireless modem) coupled to the power supply rail 300 is transmitting (e.g. during burst transmit), the transmit TX_ENABLE signal of the interface device is used to turn field effect transistor (FET) 302 OFF. Under these circumstances, current drawn by the power amplifier (PA) 304 of the wireless network interface device bypasses FET 302 and flows through the series combination of FET 306 and resistor 308. In an exemplary embodiment, the ESR under these circumstances is 0.83Ω. On the other hand, when PA 304 is not transmitting, both FET 302 and FET 306 are ON and current flows through both FET 302 and the series combination of FET 306 and resistor 308. Under these circumstances, FET 302 is in parallel with the series combination of FET 306 and resistor 308. Consequently, the ESR of the power supply rail 300 is lower (0.17Ω in an exemplary embodiment) than when the interface device is transmitting.

According to embodiments of the present invention, varying the ESR of power supply rail 300 allows a super capacitor 310 to be controlled so that it functions as the primary current source (as opposed to the host power supply) for the PA 304 during the time the wireless network interface device is transmitting data, e.g., during burst transmits. It is during burst transmits that a supplemental current source, besides the host power supply, is needed, not only so that the massive current demands required of the PA 304 can be provided, but also so that the maximum allowable current draw from the host power supply, as specified by a relevant standard, is complied with. During burst transmits, the ESR of the supply rail 300 is increased to a value that is greater than the ESR of the super capacitor. When the wireless network interface device is not transmitting, the ESR of the power supply rail 300 is lowered to a value that is less than the ESR of the super capacitor 310, thereby placing the super capacitor 310 in a charging state. Under this condition, the super capacitor 310 is allowed to charge so that it is able to supply current to the PA 304 during subsequent burst transmits.

By supplementing the current drawn from the host power supply with current from the super capacitor during transmission, the large currents required for Class 8 and Class 10 modem burst transmits can be provided without violating the relevant maximum host supply current draw specification. In particular, according to an embodiment of the present invention, the ESR control system 30 of FIG. 3 can be used to allow Class 10 operation while still maintaining compliance with the CF+500 mA maximum current draw specification. This capability is demonstrated in Table I below. Table I compares the peak current drawn by an RF power amplifier of a wireless network interface device, under Class 10 operation, for circumstances where: (i) no super capacitor or ESR control present; (ii) with a super capacitor present but no ESR control present; and (iii) with both a super capacitor and ESR control present, the latter circumstance illustrative of an embodiment of the present invention.

TABLE I

| | Without Super Capacitor and Without ESR Control | With Super Capacitor and Without ESR Control | With Super Capacitor and With ESR Control |
|---|---|---|---|
| Peak Current Draw | 1.21 amps | 0.511 amps | 0.441 amps |

Table I shows that when no super capacitor and no ESR control are present, the peak current drawn by the power amplifier from a host power supply is in excess of 1 A. Hence, the PCMCIA maximum current draw specification of 1.0 amp is violated as too is the CF+ maximum current draw specification of 0.5 amps. The addition of the super capacitor lowers the current draw from the host supply down to 0.511 amps. This brings the power amplifier into compliance with the PCMCIA specification. However, use of the super capacitor alone is insufficient to bring the power amplifier into compliance with the CF+ maximum current draw specification. In contrast to the first two circumstances, when both a super capacitor and the ESR control methods and apparatus of the present invention are employed, the peak current drawn by the power amplifier from the host power supply is 0.441 amps. This brings the power amplifier into compliance with both the PCMCIA and CF+ specifications.

During normal operation FET 306 of the ESR control system 30 is ON. However, if an over-current condition arises as may happen, for example, if the antenna 312 of the wireless modem is damaged, FET 306 provides over-current protection. In particular, once the current demand of the wireless modem exceeds some predetermined threshold, a PA_SHUTDOWN signal (e.g. an interrupt issued by a microprocessor on the wireless network interface card) may be coupled to the control gate of FET 306 to turn FET 306 OFF, and thereby decouple the host power supply from the PA 304.

Although not required, as shown in FIG. 3, the ESR control system 30 may also include a current sensor 314 that is configured to measure the current being drawn by the PA 304. A very low voltage dropped across low resistance resistor 316 is used to 'measure' a voltage drop across the resistor. This measured voltage is coupled to inputs of a first operational amplifier (op-amp) 318, which provides a voltage at its output that is representative of the current being drawn by the PA 304. The output of op-amp 318 is compared to a reference voltage, VREF, using a second op-amp 320 configured as a comparator. If the voltage of the output of the first op-amp 318 exceeds VREF an over-current condition (e.g which may occur, for example if the modem antenna is broken) has been detected. This over-current detection can then be provide to an interrupt generator 322 to generate an ERROR signal, which can be used to notify the user or the firmware of the wireless modem that there is a problem.

Although not required, as shown in FIG. 3, the ESR control system 30 may also include a voltage detector 324 and a buck regulator 326 to accommodate either 3.3 or 5 volt host supply nominal voltages. These optional components help to maximize power efficiency and to minimize heat dissipation. The voltage detector 324 detects which of these two voltages power supply rail 300 is at. If at 3.3 volts nominal, a pass transistor 328 is turned ON, the buck regulator is bypassed, and the supply voltage is allowed to pass to the PA 304. On the other hand, if the supply voltage is at 5 volts nominal, pass transistor 328 is turned OFF and the buck regulator 326 converts the 5 volts to a 3.3 volts, which voltage is then allowed to pass to the PA 304. In either case, a low drop out (LDO) regulator 330 may by optionally included as a means for supplying power to the rest of the wireless network interface device (e.g., not PA, but rest of the radio portion of the interface device, logic circuitry, etc.).

Figure 4:
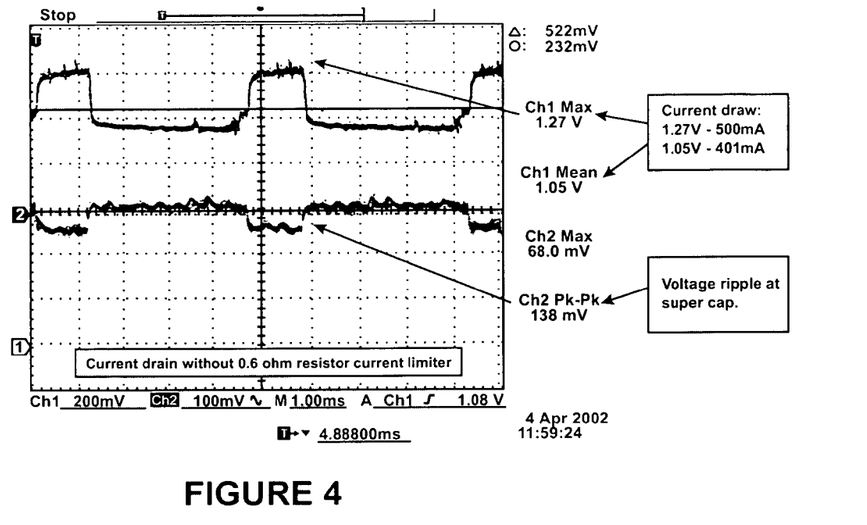
FIG. 4 shows a graph of the current drawn by a PA of a system (e.g. wireless network interface device) not having ESR control.
Figure 5:
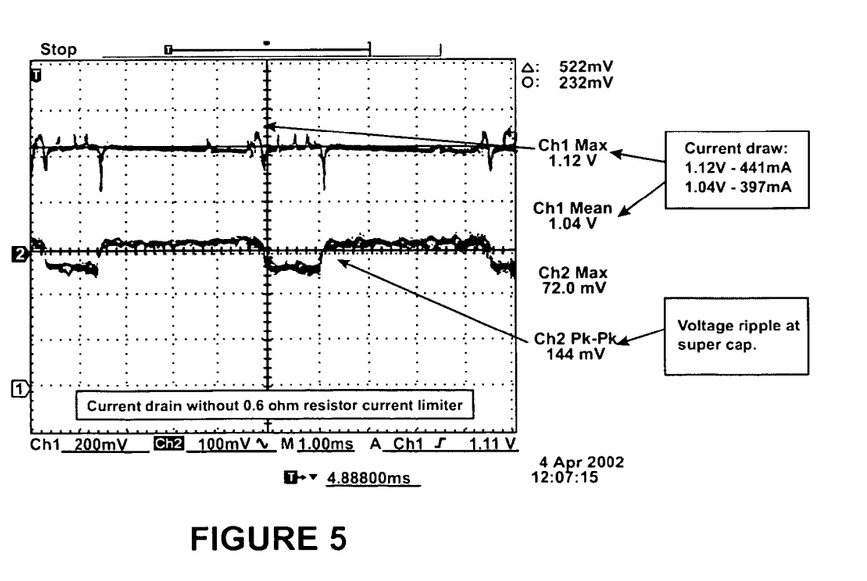
FIG. 5 shows a graph of the current drawn by a PA of a system (e.g. wireless network interface device) having ESR control, according to embodiments of the present invention.

Referring now to FIGS. 4 and 5, there are shown oscilloscope (scope) charts of a Class 10, 0.8 Watt GSM system without ESR control (FIG. 4) and with ESR control (FIG. 5). The scope chart for the system with ESR control (i.e. FIG. 5) employs an ESR control system like that shown in FIG. 3. The scope chart in FIG. 4 shows the current drawn from a host power supply by a PA of the wireless network interface device not having the TX_ENABLE controlled FET 302 or the series combination of FET 306 and resistor 308. The scope chart in FIG. 4 shows that the current draw from the host supply by the PA is about 500 mA, which is the upper limit of the CF+ maximum allowable current draw specification. By contrast, the scope chart in FIG. 5 shows, by the absence of the peak currents during burst transmits, that the additional current drawn by the PA 304 during burst transmits is nearly entirely supplied by the super capacitor and not the host power supply.

Figure 6:
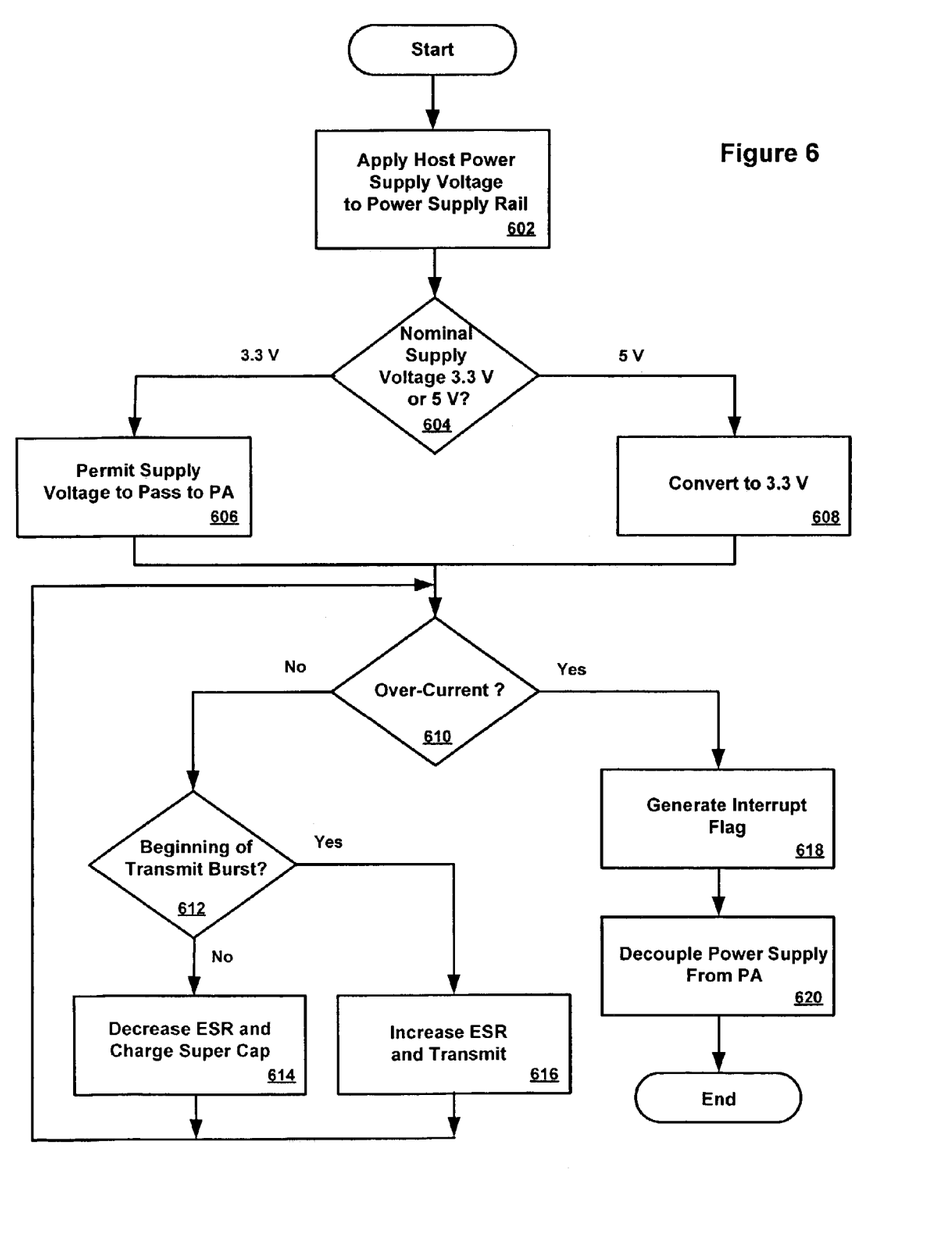
FIG. 6 shows a flow diagram that illustrates a method of varying and controlling the ESR of a power supply rail, according to embodiments of the present invention.

Referring now to FIG. 6, there is shown a flow diagram illustrating a method of varying and controlling the ESR of a power supply rail, according to an embodiment of the present invention. At step 602, the host power supply voltage is coupled to the power supply rail of the wireless network interface device. At optional step 604, a determination is made whether the host nominal supply voltage is 3.3 volts or 5 volts. If the voltage detector 324/buck regulator 326 apparatus described above is not present the method continues at step 610. Otherwise, if it is determined that the host nominal supply voltage is 3.3 volts, the supply voltage is allowed to pass to the PA 304 of the wireless network interface device. If it is determined that the host nominal supply voltage is 5 volts, the 5 volts is converted to 3.3 volts nominal by the buck regulator. Next, at optional step 610, the system determines (e.g. using a current sensor 314) whether there exists an over-current condition (i.e. current draw exceeding some predetermined or specified limit) measurement is performed. It should be noted that this step does not necessarily have to occur in the chronology shown in the flow diagram in FIG. 6. Indeed, it may occur at other times in the process and may even be performed at all times during the process. If optional step 610 is not performed, the method continues at decision block 612, where it is determined whether a burst transmit is commencing. If yes, the ESR of the power supply rail is increased and the system transmits with the aid of super capacitor 310. If no, the ESR is left unchanged and the super capacitor remains in a charging state, unless the system has just completed a burst transmit, in which case the ESR is lowered to transition the super capacitor 310 into the charging state. If at optional step 610 an over-current condition is detected, at optional step 618 an interrupt flag is generated, after which at step 620 the power supply rail is decoupled from the PA 304.

Whereas the above is a complete description of the preferred embodiments of the invention, various alternatives, modifications, and equivalents may be used. For example, whereas some of the description provided above is presented in the context of a wireless network interface device (e.g. a wireless modem), CompactFlash cards and compliance with the CF+ specification, those skilled in the art will readily understand that the spirit of the invention encompasses not just wireless modems, CompactFlash cards, and compliance with the CF+ specification, but also encompasses PC Card and PC Card like interface devices. Indeed, the inventions disclosed in this specification are applicable to any host/wireless network interface device application that is current limited. Therefore, the above description should not be taken as limiting the scope of the invention as it is defined by the appended claims.

What is claimed is:

1. A method of varying and controlling the effective series resistance (ESR) of a power supply rail configured to transmit power from a power supply of a host device to a wireless network interface device, comprising:

coupling a supply voltage from a power supply of a host device, via a power supply rail, to a power input of a wireless network interface device;

determining whether the wireless network interface device is transmitting or is about to transmit over a wireless network; and increasing the ESR of the supply rail to prevent current over drawn from the power supply of the host device during a time when the wireless network interface device is transmitting or is about to transmit over a wireless network, the supply voltage functioning as the primary current source.

2. The method of claim 1, further comprising lowering the ESR of the supply rail during a time when the wireless network interface device completes transmitting or is about to complete transmitting, the power supply functioning as the primary current source.

3. The method of claim 1 wherein a transmit (TX) enable signal from the wireless network interface device is used to initiate increasing the ESR of the supply rail.

4. The method of claim 2 wherein a transmit (TX) enable signal is used to initiate lowering the ESR of the supply rail.

5. The method of claim 2 wherein a first value of a transmit (TX) enable signal from the wireless network interface device is used to initiate increasing the ESR of the supply rail; and a second value of the TX enable signal is used to initiate lowering the ESR of the supply rail.

6. The method of claim 1 wherein the power input of the wireless network interface device embodies a power input of a power amplifier of the interface device.

7. The method of claim 1, further comprising supplying current to the power input from a capacitor coupled to the power supply rail during the time when the wireless network interface device is transmitting or is about to transmit.

8. The method of claim 7, further comprising charging the capacitor during the time when the wireless network interface device completes transmitting or is about to complete transmitting.

9. The method of claim 7 wherein an ESR of the capacitor is less than the ESR of the supply rail during the time when the wireless network interface device is transmitting or is about to transmit.

10. The method of claim 1 wherein the wireless network interface device comprises a wireless modem.

11. The method of claim 10 wherein the wireless modem comprises a Class 10, two transmit (TX) time slot wireless modem.

12. The method of claim 1 wherein the wireless network interface device comprises a card having a wireless modem.

13. The method of claim 10 wherein the wireless network interface device comprises a card having a wireless modem.

14. The method of claim 1, further comprising using a capacitor, coupled to the supply rail, as a current source to help prevent current drawn from the power supply of the host device from exceeding a predetermined maximum allowable current draw.

15. The method of claim 14 wherein the predetermined maximum allowable current draw is in an arrange from 0.5 amperes to 1 amperes.

16. A wireless network interface device, comprising:

a variable effective series resistance (ESR) power supply rail configured to transmit power from a power supply of a host device to the wireless network interface device, when the wireless network interface device is connected to said host device;

a power amplifier (PA) configured to accept a power supply voltage from said host device, via said variable ESR power supply rail, when the wireless network interface device is connected to said host device;

a capacitor operable to supply power to said PA, when the wireless network interface device is connected to said host device and when the wireless network interface device is transmitting, the capacitor functioning as the primary current source;

a current sensor to determine whether the wireless network interface device is transmitting or is about to transmit over a wireless network; and a transistor coupled to said variable ESR power supply rail, wherein said transistor turns off a portion of said variable ESR power supply rail to prevent current over drawn from said power supply voltage of said host device when the wireless network interface device is transmitting.

17. The wireless network interface device of claim 16 wherein an ESR of the variable ESR power supply rail is greater than an ESR of the capacitor, when the wireless network interface device is transmitting.

18. The wireless network interface device of claim 16 wherein an ESR of the variable ESR power supply rail is less than an ESR of the capacitor, when the wireless network interface device is not transmitting, the power supply functioning as the primary current source.

19. The wireless network interface device of claim 16 wherein the capacitor operates to assist preventing current drawn from the power supply of the host device from exceeding a predetermined maximum allowable current draw, when the wireless network interface device is connected to said host device and when the wireless network interface device is transmitting.

20. The wireless network interface device of claim 19 wherein the predetermined maximum allowable current draw is in an arrange from 0.5 amperes to 1 amperes.

21. An apparatus for varying the effective series resistance (ESR) of a power supply rail configured to transmit power from a power supply of a host device to a wireless network interface device, comprising:

means for coupling a supply voltage from a power supply of a host device, via a power supply rail, to a power input of a wireless network interface device, the supply voltage functioning as the primary current source;

means determining whether the wireless network interface device is transmitting or is about to transmit over a wireless network; and means for increasing the ESR of the supply rail to prevent current over drawn from the power supply of the host device during a time when the wireless network interface device is transmitting or is about to transmit data over a wireless network.

22. The apparatus of claim 21, further comprising means for lowering the ESR of the supply rail during a time when the wireless network interface device completes transmitting, the power supply functioning as the primary current source.

23. The apparatus of claim 21 wherein the means for increasing the ESR of the supply rail is controlled by a transmit (TX) enable signal from the wireless network interface device.

24. A method of limiting a current drawn by a wireless network interface device from a power supply of a host device during times when a radio frequency (RF) transmitter of said wireless network interface device is transmitting, said method comprising:
- connecting a power supply of a host device to a power input of a wireless network interface device;
- determining when the RF transmitter of the wireless network interface device is transmitting or is about to transmit over a wireless network;
- increasing the effective series resistance (ESR) of the power supply to prevent current over drawn from the power supply of the host device, in response to determining when the RF transmitter is about to transmit; and
- using a capacitor to provide power to a power amplifier of the RF transmitter when the RF transmitter is transmitting, the capacitor functioning as the primary current source.

25. The method of claim 24, further comprising using a transmit (TX) enable signal from the wireless network interface device to initiate increasing the ESR of the host power supply.

26. The method of claim 24, further comprising decreasing the ESR of the power supply after the RF transmitter has completed transmitting, the power supply functioning as the primary current source.

27. The method of claim 26 wherein a final value of the ESR of the power supply following completion of decreasing the ESR is less than an ESR of the capacitor.

28. The method of claim 24 wherein a final value of the ESR of the power supply following completion of increasing the ESR is greater than an ESR of the capacitor.

* * * * *